Patented Aug. 14, 1951

2,564,534

UNITED STATES PATENT OFFICE 2,564,534

POLYCHLORINATED VINYLCYCLOHEXENE AND ITS USE AS INSECTICIDE

Herbert L. Johnson, Media, and Archibald P. Stuart, Norwood, Pa., assignors to Sun Oil Company, Philadelphia, Pa., a corporation of New Jersey No Drawing. Application October 24, 1947, Serial No. 782,018

1 Claim. (Cl. 260—648)

This invention relates to novel compounds derived from vinylcyclohexene by chlorination reactions. More specifically, it deals with the substitution chlorination of the tetrachloro derivative of 4-vinylcyclohexene to prepare polychlorinated derivatives of 4-vinylcyclohexene having at least five chlorine atoms to the molecule and to the products thus obtained. These products possess insecticidal effect.

In copending application Serial No. 682,598 filed July 10, 1946, by the instant inventors, now Patent No. 2,518,017, there is described and claimed the chlorination of 4-vinylcyclohexene to produce certain chlorinated derivatives of 4-vinylcyclohexene which are also claimed. Among these derivatives is 1,2-dichloro-4-($\alpha,\beta$-dichloroethyl) cyclohexane which is prepared by chlorination of vinylcyclohexene dissolved in a suitable solvent at a low temperature. Elemental chlorine is used for this reaction which is one of addition.

We have now found that vinylcyclohexene can be further chlorinated if actinic light be employed to catalyze the reaction. This further chlorination is not accomplished by means of an addition reaction but by a substitution reaction in which at least one hydrogen atom, of the 1,2-dichloro-4-($\alpha,\beta$-dichloroethyl) cyclohexane, already present, is replaced by at least one chlorine atom.

Accordingly, the present invention is directed to the chlorination of 1,2-dichloro-4-($\alpha,\beta$-dichloroethyl) cyclohexane with elemental chlorine in the presence of actinic light and to the products thereby obtained.

The chlorination may be effected upon 4-vinylcyclohexene by conducting the initial part of the reaction under conditions favoring chlorine addition, and, after the olefinic linkages have been saturated, effecting the substitution chlorination. Or, if desired, the 1,2-dichloro-4-($\alpha,\beta$-dichloroethyl) cyclohexene can be recovered from the reaction mass and then further chlorinated employing the substitution reaction of this invention.

According to the invention it is possible to substitute one or more hydrogen atoms of the 1,2-dichloro-4-($\alpha,\beta$-dichloroethyl) cyclohexane with one or more chlorine atoms, respectively. Thus tests show that up to nine chlorine atoms can be introduced into the vinylcyclohexene molecule, that is, four atoms, by means of the addition reaction of Serial No. 682,598, above mentioned, and the remaining chlorine atom or atoms by means of the reaction of this invention.

Owing to the nature of the product it has not been possible to determine its exact composition. Thus, it may well be, when a chlorine analysis corresponding to seven chlorine atoms in the molecule is obtained, that there is actually present some material having less than seven chlorine atoms to the molecule and some material having more than seven chlorine atoms to the molecule. The density increase with chlorination is a good practical measure of the quantity of chlorine which has been introduced into the molecule at any given time. The products of the invention are stable. Decomposition tests at temperatures exceeding 115° C. showed only about 0.1 milligram of hydrochloric acid evolved per gram of sample containing about 70% of combined chlorine.

The chlorination reaction is readily effected by passing elemental chlorine into the 4-vinylcyclohexene or into the 1,2-dichloro-4-($\alpha,\beta$-dichloroethyl) cyclohexane. The temperature during chlorination may reach as high as 150° C.–175° C. However, it is preferable to maintain the temperature in the neighborhood of 100° C. for better chlorination. A too low temperature is one at which poor contact is obtained between the chlorine and the reaction mass owing to its increased viscosity. Stirring will assist in maintaining good contact of the chlorine with the reaction mass. Chlorinated solvents may be employed to reduce the viscosity, if desired. Hydrogen chloride will be removed preferably as it is formed.

The following examples serve to illustrate the invention:

Example I 1,2-dichloro-4-($\alpha,\beta$-dichloroethyl) cyclohexane was heated at 125° C. and irradiated by ultraviolet light from a 100 watt General Electric type A-H4 bulb. Chlorine was passed through the reaction mixture for 16 hours at a rate of 100 ml. per minute. The product was dissolved in methylene chloride, washed with 5% solution of sodium bicarbonate and dried. On evaporation of the solvent under vacuum, there was left as a residue an amber colored viscous liquid which was found, on analysis, to contain 60.64% chlorine. The theoretical value for $C_8H_{12}Cl_4$, that is, 1,2-dichloro-4-($\alpha,\beta$-dichloroethyl) cyclohexane is 55.43%. For $C_8H_{11}Cl_5$, the calculated value is 62.45%. The product had a density of 1.4924 at 20° C.

Example II 4-vinylcyclohexene (21 g. 2 mols) was dissolved in 400 ml. of chloroform and cooled in a bath of carbon tetrachloride and Dry Ice while chlorine was passed in at the rate of 200 ml. per minute. After 4 mols of chlorine had been absorbed, chlorination was temporarily discontinued and the solvent removed from the reaction mixture under vacuum. The residue was heated to 125° C. and irradiated with ultraviolet light. Chlorination was resumed, and continued for twenty-four additional hours. After working up the reaction mixture as previously described the product was obtained as a viscous amber oil which was found to contain 69.3% chlorine. The refractive index of the product was $$1.5671 n\frac{25}{D}$$

Since it is not possible to purify the reaction product by distillation, only limited physical properties can be given. The density was 1.6198 at 20° C. The product can be designated only as a derivative of 1,2-dichloro-4-($\alpha,\beta$-dichloroethyl) cyclohexane in which one or more hydrogen atoms have been replaced by chlorine.

The products of this invention has been found to possess good kill when tested in the usual manner for insecticidal value against the common household fly. It is noteworthy that 1,2-dichloro-4-($\alpha,\beta$-dichloroethyl) cyclohexane from which the product of this invention has been prepared does not possess sufficient kill to class it as an insecticide whereas the immediately following compound, namely the chlorinated 1,2-dichloro-4-(dichloroethyl) cyclohexane having a chlorine content of 63.6% is not only an insecticide but happens to be the only one of all of the compounds of the invention thus far tested to possess an effectiveness greater than that of the official test insecticide. Although, the remaining products, particularly those corresponding substantially to $Cl_6$, $Cl_7$ and $Cl_8$ possess a good insecticidal effect, that compound which corresponds to $Cl_5$ (63.6% Cl) showed 18.5 units greater effectiveness than the official test insecticide. The 1,2-dichloro-4-(dichloroethyl) cyclohexane showed minus 43.7 units less effectiveness than the official test insecticide.

Thus, according to this invention a novel and highly efficient insecticide is obtained by compounding a minor proportion of a polychlorinated derivative of vinylcyclohexene, containing at least five chlorine atoms to the molecule, with a carrier, solid, liquid or even gaseous in character. Below are listed the test results obtained with a solution of 5% of the polychlorinated ethyl cyclohexane in 95% "Deobase," a deodorized kerosene usually employed in the compounding of insecticide solutions and adapted for dispersion in the atmosphere by spraying or other means.

In the table "$Cl_4$, $Cl_5$, $Cl_6$, $Cl_7$, $Cl_8$" indicate reaction products of the invention which on analysis showed an average chlorine content corresponding substantially to the subscript mineral.

|  | $Cl_4$ (56.9% Cl) | $Cl_5$ (63.6% Cl) | $Cl_6$ (68.26% Cl) | $Cl_7$ (74.93% Cl) | $Cl_8$ (76.25% Cl) |
|---|---|---|---|---|---|
| Official Test Insecticide Kill in 24 Hours | 52.8 | 51.1 | 51.1 | 51.1 | 51.1 |
| Kill of Invention Sample | 9.1 | 70.0 | 46.7 | 47.4 | 18.1 |
| Difference | −43.7 | +18.5 | −4.4 | −3.7 | −32.5 |
| Official Test Insecticide Knockdown 10 mins | 94.6 | 86.7 | 97.1 | 97.1 | 97.1 |
| Knockdown of Invention Sample | 15.4 | 70.1 | 51.3 | 47.1 | 19.3 |
| Difference | −79.2 | −16.6 | −45.8 | −50.0 | −77.8 |
| Total Flies Used | 852 | 1,040 | 810 | 850 | 772 |

The kill value of the insecticide according to this invention is sufficient to class it as a grade AA insecticide. However, the knockdown is somewhat poor. Accordingly, to obtain more effective knockdown it is within the scope of the invention to use the polychlorinated product in conjunction with a material possessing good knockdown value.

The products of the invention also appear to possess usefulness in the preparation of plasticizers, as extreme pressure lubricant additives and as chemical intermediates.

We claim:

The derivative of 4-vinylcyclohexene having a chlorine content of about 63% prepared by introducing, at a temperature of from 100° C. to 175° C., chlorine into 1,2-dichloro-4-($\alpha,\beta$-dichloroethyl) cyclohexane in the presence of actinic light, and separating from the reaction mixture said derivative having a chlorine content of about 63%.

HERBERT L. JOHNSON.
ARCHIBALD P. STUART.

REFERENCES CITED

The following references are of record in the file of this patent:

UNITED STATES PATENTS

| Number | Name | Date |
|---|---|---|
| 2,287,665 | Britton et al. | June 23, 1942 |

OTHER REFERENCES

Brown et al., "Chemical Society Journal," 1944, pages 1101-3.

Lebedev et al., "Jour. Rus. Phys. Chem. Soc.," vol. 43, page 1127 (1911). Unofficial translation in 260-648.

Van der Linden, Rec. trav. chim., vol. 67, pages 1075-1086 (1938) thru Chem. Abst., vol. 33, pages 1280-1281.